United States Patent [19]

Watanabe et al.

[11] Patent Number: 4,918,806
[45] Date of Patent: Apr. 24, 1990

[54] METHOD FOR MANUFACTURING A PISTON

[75] Inventors: Ryuji Watanabe, Oizumi; Motohiko Kosano, Isezaki; Hirokazu Kawakami, Ota, all of Japan

[73] Assignee: Sanyo Electric Co., Ltd., Osaka, Japan

[21] Appl. No.: 310,790

[22] Filed: Feb. 14, 1989

[30] Foreign Application Priority Data

Feb. 18, 1988 [JP] Japan .................. 63-35674

[51] Int. Cl.$^5$ ............................................. B23P 15/10
[52] U.S. Cl. .................. 148/16.5; 29/527.4; 29/888.048
[58] Field of Search ............ 29/156.5 R, 527.2, 527.4; 148/16.5, 16.6, 16, 13, 6.3, 6.35; 123/193 P, 193 LP; 92/208

[56] References Cited

U.S. PATENT DOCUMENTS

| 1,061,922 | 5/1913 | Patrick | 29/156.5 R |
| 2,201,405 | 5/1940 | McCarroll | 29/156.5 R |
| 3,596,571 | 8/1971 | Hill et al. | 123/193 P |
| 4,364,159 | 12/1982 | Holcomb | 123/193 P |
| 4,496,401 | 1/1985 | Dawes et al. | 148/16.6 |
| 4,531,502 | 7/1985 | Mizuhara | 123/193 P |
| 4,553,472 | 11/1985 | Munro et al. | 29/156.5 R |
| 4,596,611 | 6/1986 | Dawes et al. | 148/16.6 |
| 4,656,711 | 4/1987 | Yagi et al. | 29/156.5 R |

FOREIGN PATENT DOCUMENTS

| 5441244 | 2/1976 | Japan . | |
| 0013219 | 1/1983 | Japan | 29/156.5 R |

Primary Examiner—Howard N. Goldberg
Assistant Examiner—Irene Cuda
Attorney, Agent, or Firm—Darby & Darby

[57] ABSTRACT

In a method for manufacturing a piston a metal piston is prepared which has a skirt tapered towards the bottom end to such an extent that a diameter of the metal piston becomes uniform after a heat treating step. The metal piston is heat treated in a gas containing nitrogen and carbon to form a nitride film layer on the outer surface of the piston and to transform the skirt.

9 Claims, 1 Drawing Sheet

METHOD FOR MANUFACTURING A PISTON

BACKGROUND OF THE INVENTION

1. Field of the Invention

The present invention relates to a method for manufacturing a piston employed, for example, in a compressor.

2. Description of the Prior Art

Pistons, which are usually made of metal such as gray cast iron or steel, has been improved in abrasion resistance of the outer surface, because it reciprocates very fast in cylinders. Japanese Patent Publication No. 41244/1979, for example, discloses that a piston made of aluminum has its outer surface processed into hard almite to enhance abrasion resistance. The outer surface of the piston is further hardened by cementation to enhance abrasion resistance more.

Meanwhile, pistons usually have a cavity inside and a thin and cylindrical skirt at least.

According to the foregoing, since the outer surface of the piston is processed by heat hardening such as cementation hardening and the skirt of the piston is thin and cylindrical, the skirt tends to flare or spread outwards to the bottom when heated. Therefore, polishing the outer surface of the piston as a finish, a part of a hardened layer on the outer surface of the skirt is abraded more than the other part of the hardened layer, so that the hardened layer will not be uniform in thickness throughout the piston. As a result, desired abrasion resistance cannot be obtained. This is a problem to be solved and it may occur particularly with regard to a piston of ball joint type, which comprises a skirt having a relatively long thin portion.

In view of the above, the present invention provides a method for manufacturing a piston which has a hardened layer uniform in thickness formed on the whole outer surface without weight increase to highly resists abrasion.

SUMMARY OF THE INVENTION

A method for manufacturing a piston in accordance with the present invention comprises the steps of; preparing a metal piston which has a skirt tapered towards the bottom to such an extent that a diameter of the metal piston may become uniform after the next heat treating step; heat treating the metal piston in a gas containing nitrogen and carbon to form a nitride film layer on its outer surface and to transform the skirt; and polishing the outer surface of the layer.

That is, the present invention is mainly characterized in that the metal piston which has a skirt gently tapered towards the bottom to such an extent that diameter of the metal piston may become uniform throughout after the next heating step. Accordingly, a processed piston having a thin skirt and having enhanced abrasion resistance can be manufactured.

DETAILED DESCRIPTION OF THE PREFERRED EMBODIMENTS

Figure 1:
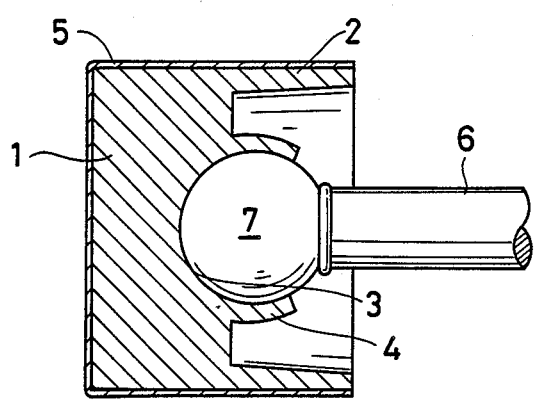
FIG. 1 is a sectional view showing a piston manufactured by a method in accordance with the present invention.

An embodiment in accordance with the present invention will now be described with reference to the drawings.

A ball joint type piston 1 made of steel has a cylindrical thin portion 2 as a skirt and a ball seat 3 and a crimp portion 4 therein. A nitride layer 5 is formed on the outer surface of the piston 1 with about 1 to 5 μm thickness. This piston 1 is rotatably jointed to a ball 7 which is provided at one end of a connecting rod 6, and is able to reciprocate in a cylinder not shown. In order to joint the piston 1 to the ball 7, the ball 7 is fitted into the ball seat 3, and then the portion 4 is crimped to prevent the ball 7 from dropping out of the seat 3. The other end of the connecting rod 6 is connected to a crankshaft not shown herein.

Figure 2:
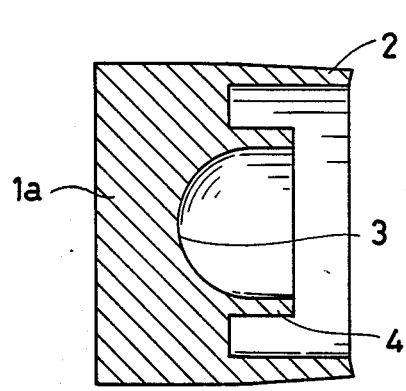
FIG. 2 is a sectional view showing a base piston formed to gently taper to the bottom by cutting and grinding.
Figure 3:
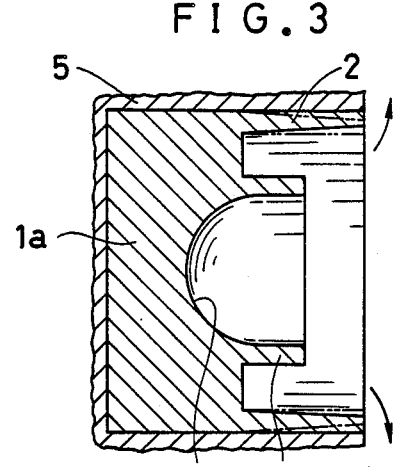
FIG. 3 is a sectional view showing the base piston formed a nitride film on the outer surface thereof by heat treatment.
Figure 4:
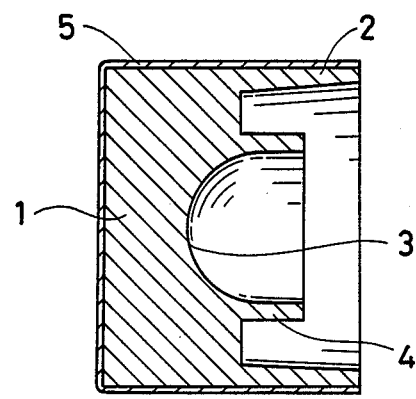
FIG. 4 is a sectional view showing the base piston finished by ordinal polishing.

The above described piston 1 is manufactured through the following process steps. A steel material such as SS41 (JIS) is put into cold foregoing. Then by cutting and grinding the steel material, a base piston 1a is provided with the thin portion 2, the ball seat 3 and the crimp portion 4. In this stage, the outer surface of the thin portion 2 is formed to gently taper to the bottom as shown in FIG. 2. When the piston 1a is treated by heat, this taper will cause the configuration of the piston 1a to be cylindrical; in other words, the outer diameter of the piston 1a to be uniform throughout. (Needless to say, the taper is concerned only with the outer diameter of the piston 1a.) More specifically, in case of a steel base piston with a skirt (having a 22 mm diameter and a 15 mm length, and a 1 mm thickness of the skirt), for example, a diameter of the skirt should be about 15 μm smaller at the bottom end than the diameter at the top end of the piston 1a. Consequently, this piston 1a has a taper from its top end to the bottom end so that the outer surface of the piston linearly or constantly narrows to the bottom. However, applying the present invention to a piston, a taper only in the skirt is enough which narrows linearly to the bottom. Preferably, the taper is provided by grinding the outer surface of the piston 1a after the piston 1a having a cylindrical outer surface is made.

Then, the piston 1a having such taper is heat treated in a gas of nitrogen and carbon. The gas of nitrogen and carbon contains, for example, $NH_3$ gas and $CO$ gas. For the heat treatment, well known process for forming a nitride film can be utilized. This heat treatment takes place usually at about 550° C. to 600° C. for about one hour to several hours. When ferrous material is used for the base piston 1a, the resulting nitride film upon the surface will be of composition such as carburized $Fe_3N$, $Fe_4N$ and $Fe_{16}N_2$, hardly carburized, or the like. Usually, the thickness of the nitride film is preferably about 15 to 20 μm.

During the above process, the tapered part of the piston, particularly of the skirt, transforms so that the skirt spreads outwards to the bottom, and then obtained is the piston 1a having a uniform outer diameter.

Finally, the piston 1a is finished by ordinal polishing so that the outer surface has a nitride layer 5 of 1 to 5 μm in thickness.

In accordance with the above method, although the thin portion 2 of the piston 1 flares by heat during nitride process using a gas, the resulting piston 1 will have a uniform diameter from the top end to the bottom end. Therefore, after polishing the piston 1 as a finish, the nitride layer 5 on the outer surface can be uniform in thickness. Consequently, the piston lightened by forming the thin portion 2 in the skirt to decrease a load or supplied power can still improve in abrasion resistance.

It can thus be seen that the present invention provides a method for manufacturing a piston. A piston has a tapered skirt gently thinning to the bottom. Heat treatment causes the thin portion of the piston to flare or spread outwards to the bottom end in a high temperature environment, and also causes a hardened layer to be formed on the outer surface of the piston. In accordance with the present invention, the resulting piston may have an outer diameter uniformed from its top end to the bottom with the hardened layer thereon uniformed in thickness even after polishing the outer surface as a finish. Accordingly, the lightened piston comprising the thin portion in the skirt can still improve in abrasion resistance of the outer surface.

As described above, the present invention allows for lightening a weight of a piston by forming a thin portion in a skirt thereof to reduce a load or supplied power, and enhancing the abrasion resistance of the outer surface of the piston. In accordance with the present invention, a highly reliable piston can be obtained.

What is claimed is:

1. A method of manufacturing a piston comprising the steps of:

forming a generally cylindrical metal piston with a main body having an outer first diameter and with a skirt wall extending from the main piston body with the skirt wall outer diameter tapering inwardly towards its free end to have a diameter less than said first diameter, and heat treating the piston to cause the skirt wall to expand outwardly to assume substantially said first diameter.

2. A method according to claim 1 wherein said metal piston is made of steel.

3. A method according to claim 1 wherein said heat treatment is performed at 550° C. to 600° C. for one hour to several hours.

4. A method as in claim 1 wherein the skirt wall of lesser diameter than said first diameter is formed by removing metal from the outer surface of said skirt wall.

5. A method as in claim 4 wherein said heating step is carried out in an environment containing nitrogen and carbon to form a nitride film on the outer surface of the piston.

6. A method as in claim 1 further comprising the step of forming a protecting film on the piston body outer surface.

7. A method as in claim 6 wherein said heating step is carried out in an environment containing nitrogen and carbon to form a nitride film on the outer surface of the piston.

8. A method as in claim 7 further comprising the step of polishing the nitride film.

9. A method as in claim 6 further comprising the step of polishing the protective film.

* * * * *